United States Patent
Butalla, III et al.

(10) Patent No.: US 7,859,395 B2
(45) Date of Patent: *Dec. 28, 2010

(54) INTELLIGENT DUCT SMOKE DETECTOR

(75) Inventors: Fred M. Butalla, III, Joliet, IL (US);
Saba A. Farooqui, Barrington, IL (US);
Michael R. Monroe, Batavia, IL (US)

(73) Assignee: Honeywell International Inc., Morristown, NJ (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/315,885

(22) Filed: Dec. 21, 2005

(65) Prior Publication Data

US 2007/0139209 A1  Jun. 21, 2007

(51) Int. Cl.
*G08B 29/00* (2006.01)
(52) U.S. Cl. .................. 340/506; 340/522
(58) Field of Classification Search ............ 340/506, 340/522, 628, 632; 73/863.31–863.33
See application file for complete search history.

(56) References Cited

U.S. PATENT DOCUMENTS

| | | | | |
|---|---|---|---|---|
| 3,858,195 | A * | 12/1974 | Gregg et al. | 360/12 |
| 4,342,985 | A * | 8/1982 | Desjardins | 340/525 |
| 6,124,795 | A | 9/2000 | Bernau et al. | 340/628 |
| 6,890,095 | B2 * | 5/2005 | Gul | 374/148 |
| 6,897,774 | B2 * | 5/2005 | Costa et al. | 340/522 |
| 2003/0234725 | A1 | 12/2003 | Lemelson et al. | |
| 2003/0234732 | A1* | 12/2003 | Rhodes et al. | 340/870.16 |
| 2004/0257235 | A1* | 12/2004 | Right et al. | 340/628 |
| 2005/0040943 | A1 | 2/2005 | Winick | |
| 2005/0275527 | A1* | 12/2005 | Kates | 340/539.22 |
| 2008/0015794 | A1* | 1/2008 | Eiler et al. | 702/33 |

FOREIGN PATENT DOCUMENTS

GB  2401468 A  11/2004

OTHER PUBLICATIONS

Edwards Systems Technology, "Four-wire Duct Smoke Detector", SuperDuct Series, Issue 1, Literature Sheet #85001-0583, pp. 1-6, © 2004 EST.
Air Products and Controls Inc., "Duct Smoke Detectors", SL-2000 Series, DS-DU-1 E050224, pp. 1-2, © 2005.
Air Products and Controls Inc., "Duct Smoke Detectors", SM-501 Series, DS-DU-2 C050110, pp. 1-2, © 2005.
System Sensor, "Air Duct Smoke Detector", Model DH400ACDCIHT, Manual D400-64-00, I56-991-08R, pp. 1-12, © 2003.
System Sensor, "4-Wire Low-Flow Duct Smoke Detector", Model DH100ACDCLP, Brochure A05-1044-005, Jan. 2004, #1226, pp. 1-4, © 2004.

(Continued)

*Primary Examiner*—Shirley Lu
(74) *Attorney, Agent, or Firm*—Husch Blackwell LLP Welsh Katz

(57) ABSTRACT

A control unit can be in communication with a plurality of displaced duct sensors. Sensors can be placed in supply and return ducts of an HVAC-type fluid delivery system. The unit can communicate status information as well as sensor sensitivity or other parameter values, on a per sensor basis, to a remote accessory unit via a communication protocol. The units can communicate via a wired or wireless medium.

16 Claims, 1 Drawing Sheet

OTHER PUBLICATIONS

System Sensor, "Air Duct Smoke Detector with Extended Air Speed Range", Model DH100ACDCLP, Manual D200-14-00, I56-0084-08R, pp. 1-8, © 2003.

Siemens Building Technologies, "Intelligent Photoelectric Detectors for IXL, MXL, and XL3 Control Panels", ILP Series, ILP-1, ILPT-1, Catalog No. 6164, pp. 1.4, Jul. 2001.

Siemens Building Technologies, "Ionization Smoke Detector", DI-3, DI-A3 and DI-B3, Catalog No. 6119, pp. 1-4, Oct. 2002.

Siemens Building Technologies, "Air Duct Housings", Series IL, and Series 3 Ionization or Photoelectric Detectors, Catalog No. 6124, pp. 1-6, May 2003.

Siemens Building Technologies, "Intelligent Fire Detectors for MXL, MXL-IQ and MXLV Control Panels", FP-11 FirePrint™ Detector, Catalog No. 6175, pp. 1-4, Jun. 2003.

Simplex Time Recorder Co., "Waterproof Duct Housing Enclosure 4098-9845", TrueAlam® Analog Sensing, Brochure S4098-0032-2, pp. 1-4, Apr. 2001.

Simplex Time Recorder Co., "Duct Detector Housings with TrueAlarm Photoelectric Detector for 2-Wire or 4-Wire Operation", TrueAlarm® Smoke Detectors, Brochure S4098-0029-4, pp. 1-4, Oct. 2003, © 2003 Tyco Safety Products Westminster.

Faraday 8710 Photo Dectector Product Description, available at http://www.totalcomputing.net/index. asp?PageAction=VIEWPROD&ProdID=43, published at least one year before Dec. 21, 2005.

UK Search Report for Application No. GB0624434.7, Apr. 3, 2007.

* cited by examiner

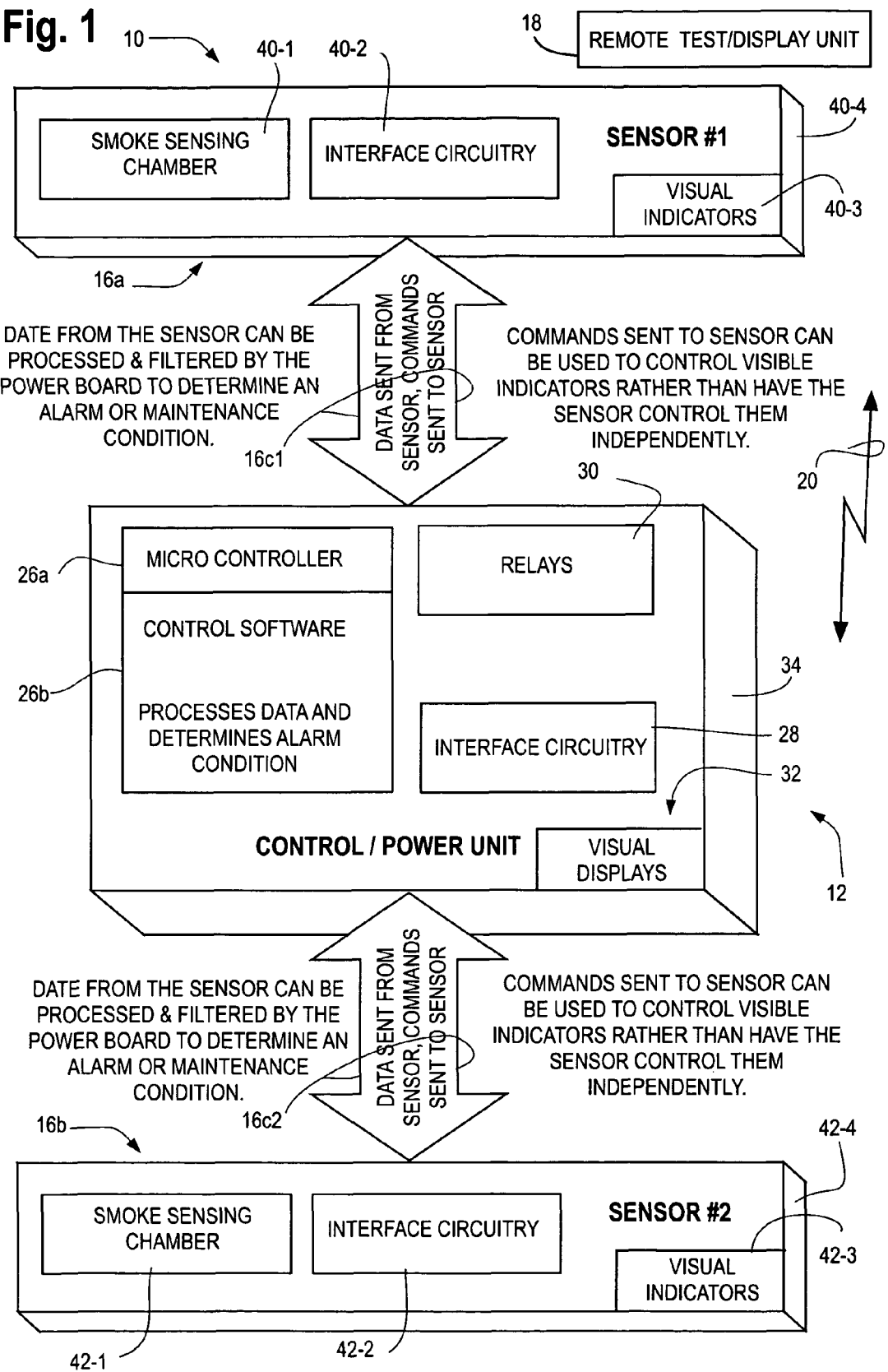

INTELLIGENT DUCT SMOKE DETECTOR

FIELD

The invention pertains to ambient condition detectors which can be coupled to various types of heating and/or air conditioning ducts. More particularly, the invention pertains to duct detectors which incorporate one or more programmable processors to provide predetermined functions.

BACKGROUND

One duct detector structure has been disclosed in U.S. Pat. No. 6,124,795 entitled "Detector Interconnect System", issued Sep. 26, 2000. The '795 patent is assigned to the Assignee hereof and is incorporated herein by reference.

Many of the known duct smoke detectors incorporate a smoke sensor and a power supply board which incorporates power supply circuitry and alarm indicating relays. In such smoke detectors, the smoke sensor unit makes an alarm determination. The circuitry on the power board then receives a signal from the smoke sensor indicating an alarm condition and responds thereto by activating local alarm indicating relays, and/or light emitting diodes to indicate an alarm condition. Such power boards are unable to make decisions based on multiple detected conditions where the unit incorporates more than one smoke sensor. This results in the sensor having to contain the filtering and processing algorithms. Thus, multiple sensors requires multiple algorithm processing capability. Further, such power boards are unable to signal the condition of the respective sensors to a displaced display/input unit in the absence of extra conductors.

There is thus a continuing need for duct detectors which can more effectively support multiple local sensors and signal remote indicating or accessory devices than have heretofore been available. Complex processing can thus be handled by one device rather than at each individual sensor, therefore simplifying the design. Preferably such duct detectors could be flexible enough to incorporate a plurality of sensing units and be able to communicate with remote indicators or accessory units, either via cables or wirelessly, without substantial additional expense or manufacturing complexity.

BRIEF DESCRIPTION OF THE DRAWING

FIG. 1 is block diagram of a system in accordance with the invention.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

A duct detector in accordance with the invention incorporates a one or more ambient condition sensors or detectors, a programmable control processor along with a control program, a state machine or a field programmable gate array (FPGA). A plurality of relays and visual alarm indicating devices can also be provided.

The programmable processor, in combination with the control software or state machine or FPGA, can receive data from one or more ambient condition sensors coupled thereto. The processor and control software or state machine or FPGA can process and filter the data and make an alarm determination relative to each of the ambient condition sensors of the unit. Types of sensors include smoke sensors, gas sensors and the like all without limitation.

The programmable processor and associated control program or state machine or FPGA can evaluate the condition of one or more ambient condition sensors and determine, for example, precise sensitivity of the respective device as well as any other parameters of interest. In that regard, the programmable processor or state machine or FPGA can adjust alarm thresholds, filter data received from the respective sensors as well as carryout alarm condition processing using data from one or more of the associated sensors. Further, in conjunction with a remote test/display unit, the programmable processor or state machine or FPGA and associated control circuitry can provide information as to condition, sensitivity, and alarm state on a per sensor basis. Additionally, the programmable processor or state machine or FPGA and associated control circuitry can provide control signals to one or more local alarm indicating visual output devices such as light emitting diodes.

In accordance with the invention, the programmable processor and associated control program or state machine or FPGA can assign different priorities to the various sensors. Priorities could be used to make decisions as to driving common alarm indicating relays without effecting the state of visible status indicators associated with each sensor. Trouble conditions and sensitivity can also be determined on a per sensor basis.

In another aspect of the invention, the programmable processor and associated control program or state machine or FPGA can receive one or more test or inquiry signals from a remote test/display unit. Such signals can be responded to, on a per sensor basis, by the local program processor and control program or state machine or FPGA. Feedback can be provided to the remote test/display unit on a per sensor basis as to whether or not the respective sensor is in a standby condition, indicating a need for maintenance or whether the sensor is indicating a trouble condition. The remote test/display unit can also be notified of each sensor's precise sensitivity.

In yet another aspect of the invention, the present programmable processor and associated control program or state machine or FPGA can communicate with displaced sensors. In this embodiment, one sensor could be located for example in the supply air side of an air handling unit. The other could be located in the return air side of an air handling unit. In other configurations, the multiple sensors could be incorporated into a common housing with the programmable processor and associated control software or state machine or FPGA.

Transmissions between control unit 12, and the sensors 16a,b and media 16c1, 16c2 can be implemented using a predetermined binary transmission protocol. Hence neither the number nor the extent of commands or data impact the selected media such as 16c1, 16c2. For example, two conductor cable can be used to transmit modulated, binary or analog, signals between unit 12 and sensors 16a,b. Only a single optical fiber would be needed in the case of an optical medium. Alternately, a wireless medium could be used, all without departing from the spirit and scope of the invention.

Further, preferably the unit 12 makes alarm determinations based on received sensor information. Unit 12 can also issue commands to respective sensors which can include commands to illuminate visual indicators such as 40-3, 42-3, or audible indicators which can be used to indicate alarm, test, trouble conditions or the like without limitation.

FIG. 1 illustrates system 10 in accordance with the invention. The system 10 includes a control/power unit 12 which is in wired or wireless communication with a plurality of sensors such as sensor 16a and sensor 16b. It will be understood that the type of sensor is not a limitation of the invention. Sensors 16a,b could include smoke sensors of various types, as well as gas sensors all without limitation. Further, one or more of the sensors such as 16a,b could be coupled to the control and power unit 12.

The system 10 can also incorporate a remote test/display unit 18. The unit 18 can be in wired or wireless communication with the control/power unit 12 via medium 20.

Each of the sensors 16a, 16b can also be in wired or wireless communication with the control/power unit 12 via medium 16c1-c2. Communications can be implemented via a binary or analog transmission protocol.

Control/power unit 12 can include control circuitry implemented as a programmable processor 26a and associated control software 26b or a state machine or a FPGA. The control hardware and software 26a,b or state machine or FPGA can be coupled via interface circuitry 28 to local condition indicating relays 30, as well as to the various sensors 16a,b and remote accessory unit 18. If desired, local visual displays 32 could also be coupled to interface circuitry 28. The unit 12 can be incorporated into a closed housing 34 if desired.

Unit 12, as noted above, via medium 16c1,c2 is in bidirectional communication with respective sensors indicated at 16a, 16b. The sensors can be the same or different without departing from the scope and spirit of the present invention. In FIG. 1, sensor 16a, incorporates a sensing chamber which could be a smoke sensing chamber 40-1 which is in turn coupled to interface and control circuitry as appropriate 40-2. The circuitry 40-2 is in bi-directional communication via medium 16c1 with the unit 12. Sensor 16a can incorporate visual output devices 40-3 and be carried in a housing 40-4.

The sensor 16b can also incorporate an ambient sensing chamber, such as a smoke sensing chamber 42-1 which is in turn coupled to control and interface circuitry 42-2. The sensor 16b is in bi-directional communication via control interface circuitry 42-2 and medium 16-2 with unit 12. Sensor 16b can also incorporate visual output devices such as the light emitting diodes 42-3. The sensor 16b can also be carried by or within a housing 42-4.

The programmable control unit 26a and associated control software 26b or state machine or FPGA of unit 12 can communicate with the sensors such as sensors 16a,b by sending one or more commands over the respective medium 16c1, 16c2. Commands can be used for example to control visual output devices such as 40-3, 42-3 as well as to query the respective sensors such as 16a,b for data.

Data could also be provided by the respective sensor on a predetermined basis to the unit 12. The unit 12 can filter incoming sensor signals in hardware or software. Various processes could be executed in determining the existence of an alarm, maintenance or trouble condition. The data can also be used to determine the precise sensitivity of the sensor. The unit 12 can initiate an alarm condition based on an analysis of data received from the respective sensor, and can activate the relays 30 in accordance therewith as well as visual output devices such as 32, 40-3 as well as 42-3. Further, the unit 12 can notify the remote accessory 18 via medium 20 as to the existence of a determined alarm state. The unit 12 can also indicate a trouble condition or the need for maintenance as would be understood by those of skill in the art.

The remote test accessory 18 can send one or more test signals to the control/power unit 12. The unit 12 will in turn evaluate the condition of the respective sensors and communicate with the remote accessory 18 accordingly. Sensor status can include standby, alarm, maintenance, trouble, and sensor sensitivity.

The unit 12 in communicating with accessory 18 via medium 20 can utilize a predetermined communications protocol for the transfer of information therebetween. Where the medium 20 is a wired medium, the use of a communication scheme results in needing fewer wires between the unit 12 and the remote accessory 18 to communicate the desired information. The communications protocol between units 12 and 18 is not a limitation of the present invention. A variety of protocols as would be understood by those of skill in the art for transmitting digital or analog signals between the units 12 and 18 could be used without departing from the spirit and scope of the present invention. In summary, the unit 12 can communicate the precise sensitivity and the status of multiple sensors, whether they are in a standby condition, alarm condition, maintenance or trouble condition independently of the state or states any other sensor such as 16a or 16b is exhibiting.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A system comprising:
   at least two duct detectors, each with an ambient condition sensor, a visual status indicator, an interface and control circuitry;
   a duct detector control unit, the duct detector control unit having at least two duct sensor ports,
   a medium associated with each of the at least two duct detectors, the medium connecting the associated duct detector with a respective one of that at least two duct sensor ports,
   control circuitry of the duct detector control unit that communicates with the interface and control circuitry of the detectors through the at least two duct sensor ports on a per port basis and in a bi-directional manner where the control circuitry further comprises:
   a processor programmed to directs control commands including queries for sensor data to the respective at least two duct detectors and receives sensor data from the at least two ports;
   a processor programmed to analyze the received sensor data from the respective at least two duct detectors, to determine the existence of an alarm based upon the received sensor data from at least one of the at least two duct detectors, to initiate an alarm condition from the analyzed sensor data and to control the visible status indicator on the at least one of the at least two duct detectors to indicate the alarm condition rather than to have the at least one of the at least two duct detectors control the visual indicator independently;
   at least one relay, and
   a port for communicating with a displaced display unit,
   wherein the control circuitry of the control unit assigns a priority to each duct sensor of the at least two duct sensors, and makes an alarm determination relative to each duct sensor associated with the at least two duct sensor ports on a per sensor basis based upon the analyzed sensor data and, responsive at least in part to the assigned priorities, activates the at least one relay where the assigned priorities are used to activate the at least one relay without effecting a state of the visible status indicator on each of the at least two duct sensors.

2. A system as in claim 1 where the control circuitry includes at least one of a processor programmed to communicate with the ports on a per port basis, a state machine to communicate with the ports on a per port basis, or a field programmable gate array to communicate with the ports on a per port basis.

3. A system as in claim 1 where the sensors comprise at least one of smoke sensors or gas sensors.

4. A system as in claim 1 where the control software communicates with the sensors via one of a wired or wireless medium.

5. A system as in claim 4 where the control software sends discrete commands to each of the sensor units.

6. A system as in claim 4 where the duct detector control unit includes additional software that analyzes received additional data from the first and second sensor units and determines sensor status on a per sensor basis.

7. A system as in claim 6 where the sensor status comprises one of standby, alarmed, in need of maintenance, emitting a trouble signal, or sensor sensitivity.

8. A system as in claim 6 where the control circuitry transmits sensor status information, on a per sensor basis, to the displaced display port.

9. A system as in claim 8 which includes circuitry that transmits in accordance with a predetermined binary or analog protocol.

10. A system as in claim 8 which includes a display and data entry unit, the control unit communicates with the display and data entry unit via the displaced display port and one of a wired or wireless medium.

11. A system comprising:
   first and second ambient condition duct sensors, each of the first and second ambient condition duct sensors is carried in a respective duct housing, each of the respective duct housings carries a visual output device visible from at least one location external to the respective housing, each of the housings includes communications circuitry for communicating in a bi-directional manner, via a predetermined protocol, with a separate displaced control unit;
   a control unit with first and second ports and at least one alarm indicating relay;
   a medium associated with each of the respective duct housings, the medium coupling the communications circuitry of the respective duct housing to a respective port of the first and second ports;
   the control unit including a control element where the control element is in bi-directional communication with the communication circuitry of the respective housings, via the respective ports, the control unit further comprising:
   a processor programmed to direct commands to the communications circuitry of the respective housings including queries for sensor data and to receive sensor data through the respective ports;
   a processor programmed to analyze the received sensor data from the respective first and second ambient condition duct sensors, to determine the existence of an alarm based upon the received sensor data from at least one of the first and second ambient condition duct sensors, to initiate an alarm condition from the analyzed sensor data and to control the visible output device on the at least one of the first and second ambient condition duct sensors rather than to have the at least one of the first and second ambient condition duct sensors control the visual output device independently, and wherein the control element of the control unit assigns priorities to each of the sensors, determines a sensor sensitivity for each of the sensors and adjusts an alarm threshold based upon the determined sensitivity for each of the sensors and, the control unit, responsive to communications from at least one of the duct sensors, makes an alarm determination with respect to the at least one of the duct sensors based upon the determined alarm threshold and, in accordance with the assigned priorities, activates the at least one relay where the assigned priorities are used to activate the at least one relay without effecting a state of the visible output device on each of the at least two duct sensors.

12. A system as in claim 11 where the duct sensors comprise at least one of a smoke sensor or a gas sensor.

13. A system as in claim 11 where the control element includes software which, in part, makes a sensor status determination where the status is selected from a class which includes a standby, non-alarmed state, an alarmed state, a maintenance indicating state and a trouble indicating state.

14. A system as in claim 13 where the software makes a status determination for each sensor.

15. A system as in claim 14 where the control element includes software for filtering at least some signals received from at least one of the duct sensors.

16. A system as in claim 14 which includes communications circuitry for communicating sensor status information and sensitivity to a displaced display unit via one of a wired or wireless medium.

\* \* \* \* \*